3,077,393
METHOD OF CONTROLLING VEGETATIVE GROWTH
John Howard, Augusta, Ga., and Stassen Y. C. Soong, Mountain View, Calif., assignors to Stauffer Chemical Company, New York, N.Y., a corporation of Delaware
No Drawing. Filed Aug. 4, 1961, Ser. No. 129,236
1 Claim. (Cl. 71—2.5)

This invention pertains to a method of combating weeds or other unwanted vegetation by means of certain herbicidal compositions containing a chloral adjunct of tartaric acid as the phytotoxic agent. The invention is also concerned with the formulation and application of such compositions.

It has now been discovered that undesirable vegetative growth can be controlled by applying thereto the chloralide of d-tartaric acid, a compound having the following formula:

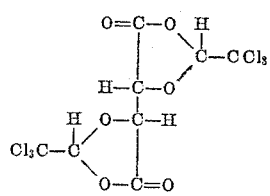

The chloralide of d-tartaric acid is a ketone derivative of bis 1,3 dioxolane, the full name according to Chemical Abstracts nomenclature, being 2,2'-bis (trichloromethyl)-(4,4'-bi-1,3-dioxolane)-5,5'-dione. It is a known material and is disclosed in the technical literature. The compound can be prepared by reacting chloral hydrate with d-tartaric acid in the presence of sulfuric acid at about room temperature. A detailed account of the synthesis is presented in Rec. trav. chim. 46, 711–4 (1927). An abstract of this article is to be found in C.A. 22, 224 (1928). It is recommended that these literature sources be consulted for further information on the aforesaid compound.

In carrying out the method of the invention, the manner in which the toxicant is brought into contact with the plant will depend on the particular circumstances. As those in the art are well aware, the dosage and mode of application of a phytocidal component depends on several variables such as the specific plant to be eradicated, plant density, weather conditions and the like.

For example, we have ascertained that the chloralide of d-tartaric acid, when applied as a post-emergence herbicidal spray, is effective in combatting such undesirable vegetation as Johnson grass, foxtail (yellow), foxtail (green), crab grass, water grass and nut grass. Although the quantity of toxicant is susceptible to variation over a wide range, a concentration of from 3 to 10 pounds per acre gave excellent control. Alternately, the d-tartaric acid chloralide can be formulated as a pre-emergence herbicide in which case a concentration of 3–10 lbs. per acre was also eminently suitable for controlling emergent seedlings of Johnson grass, foxtail (yellow), foxtail (green), crab grass, water grass and nut grass.

The herein described toxicant is especially valuable because of its specific action in those instances when it is employed as a pre-emergence herbicide. For instance, d-tartaric acid chloralide, when applied at a concentration of 5 lbs per acre, yielded excellent results in combating such noxious growths as green foxtail, crab grass, wild oats, yellow foxtail and quack grass. However, the emergent crop seedlings consisting of sugar beet, alfalfa, radish, squash, pea, tomato and corn, were not injured or adversely affected to a significant degree by the toxicant. Because of this highly directive phytocidal action, d-tartaric acid chloralide is eminently suitable for the compounding of herbicides in order to protect crops against various noxious and interfering plant growth.

In the above described pre-emergence tests, the rate of germination and growth was evaluated 17 days after application.

At the present time, it is not known by what mechanism the herein contemplated toxicant operates to stunt or otherwise control the undesirable vegetation. The herbicidal action varies to some extent from plant to plant which may be accounted for by supposing a variation in the absorption of the toxicant by a particular plant.

When used as foliage sprays, we have observed that various effects are produced on the different plants. For instance, leaf malformation was a common symptom and, in the case of foxtails, considerable leaf burn was in evidence.

In preparing phytocidal compositions, incorporating the herein described d-tartaric acid chloralide, we have found it advantageous to make use of various pest control adjuncts, modifiers, diluents, solvents and various other inert carriers. The purpose of these adjuncts is to make for convenience in handling and, in some instances, to emphasize or facilitate the herbicidal action of the active component. Such herbicidal compositions or formulations are commonly prepared in the form of either powders or liquids. In preparing liquid herbicidal compositions, the active ingredient is dissolved in an organic solvent which is subsequently diluted with water in the presence of a surface active agent to produce a dispersion or fine suspension of the toxicant. If it is desirable to employ the compound in the form of a solid, it is commonly blended with the previously mentioned solid carriers or binders which are usually selected for their ability to form homogeneous powder suitable for applying to the plants in the form of a dust.

Typical solid formulations incorporating the active components as described herein are produced by using as inert carriers, such materials as diatomaceous earth, synthetic fine silica, calcium silicate, bentonite and the like. Preferably, the solid carriers should be finely divided and it is advantageous that the particle size be less than 20 microns.

As previously stated, liquid herbicidal compositions are formulated by dissolving the d-tartaric acid chloralide in a suitable liquid solvent. The resulting solution can either be used as prepared or it may be conveniently diluted with water, thus forming a dispersion of the toxicant. If a water immiscible solvent is selected to effect dissolution, then dispersions prepared therefrom by dilution with water will consist of oily droplets containing dissolved toxicant distributed throughout the aqueous phase. On the other hand, should a water miscible solution of the compound be diluted with water, then the resulting dispersion will consist of minute particles of the solid component suspended throughout the aqueous medium. Typical water immiscible solvents for use as above described are kerosene, Stoddard solvent, aromatic hydrocarbons such as xylene, toluene and the like, higher alcohols, alkylated naphthalenes etc. Suitable water miscible solvents include the lower water soluble ketones as exemplified by acetone and methyl ethyl ketone, certain of the lower amides such as dimethyl formamide, diethyl formamide and the like, lower saturated aliphatic alcohols as typified by ethanol, isopropanol, various glycol ethers particularly Cellosolves such as methyl Cellosolve, ethyl Cellosolve and the like.

As previously pointed out, solvent solutions of the compounds can be used directly although it is the more common practice to extend such solvent solution with water to form dispersions. This technique is effected, preferably in the presence of a surface active agent which may be of the anionic, cationic or nonionic types. Examples of these adjuncts are the sulfonated animal and vegetable oils, sulfonated petroleum oils, sodium lauryl sulfonate ethylene oxide condensation products of the type produced by reacting octyl phenol with ethylene oxide, higher alkyl pyridinium halides as exemplified by lauryl pyridinium bromide and cetyldimethylbenzyl ammonium chloride. In general, highly satisfactory results ensue when the surface active agent constitutes about 1–15% by weight of the composition. We have, for instance, ascertained that excellent herbicidal compositions containing d-tartaric acid chloralide can be produced by dissolving the toxicant in acetone followed by a dilution with water in the presence of Methocel (methylated cellulose) and Vatsol (sodium salt of isopropylnaphthalene sulfonate).

We claim:

A method for controlling weeds and unwanted vegetation which comprises applying to a locus a herbicidally effective amount of the chloralide of d-tartaric acid.

No references cited.